Figures 1, 4:
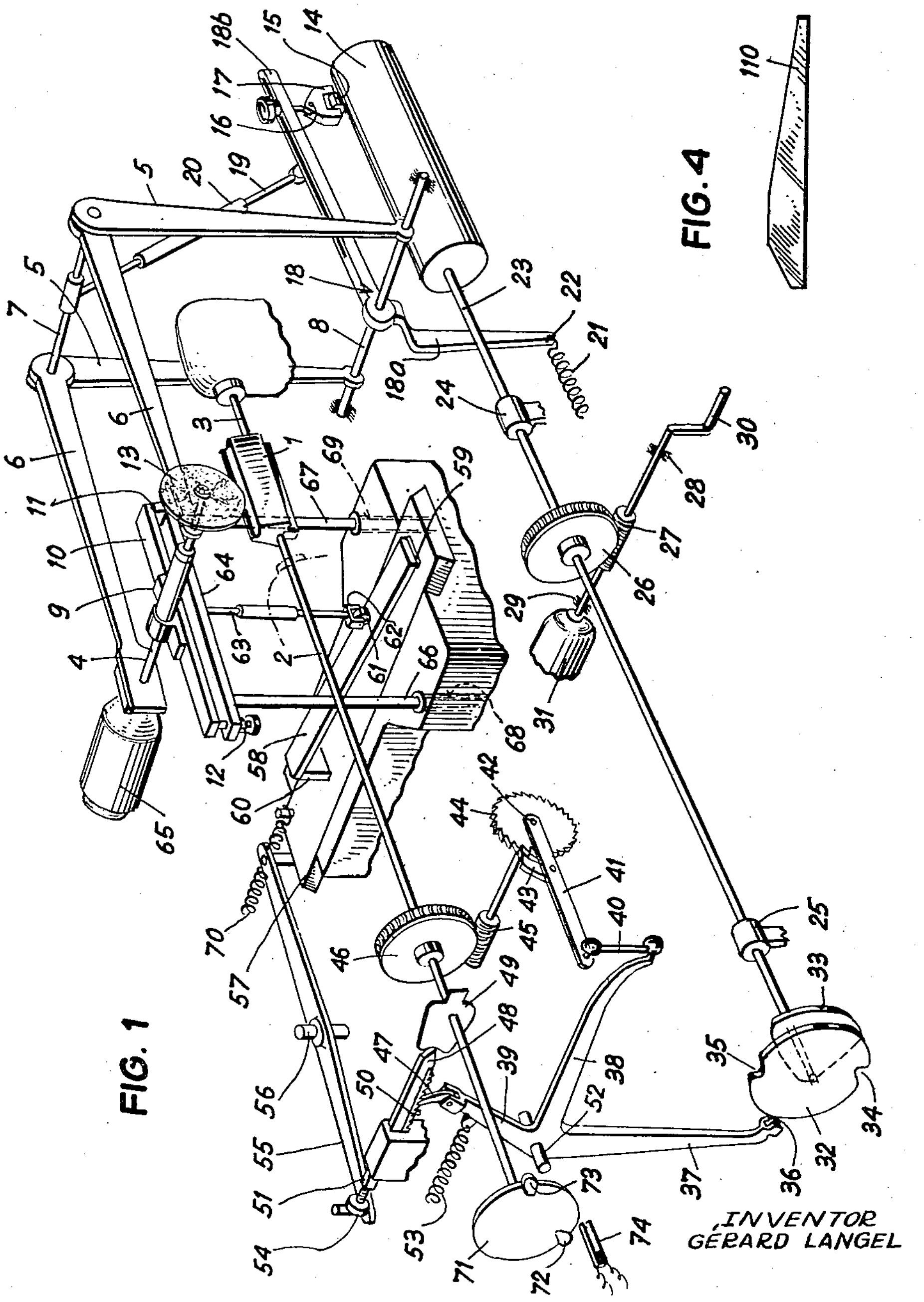

March 3, 1964 G. LANGEL 3,122,864

AUTOMATIC PROFILING MACHINE

Filed Feb. 6, 1962 2 Sheets-Sheet 1

INVENTOR
GÉRARD LANGEL

March 3, 1964 G. LANGEL 3,122,864
AUTOMATIC PROFILING MACHINE
Filed Feb. 6, 1962 2 Sheets-Sheet 2
FIG. 2
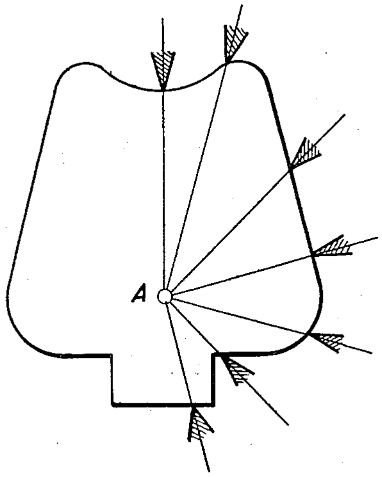
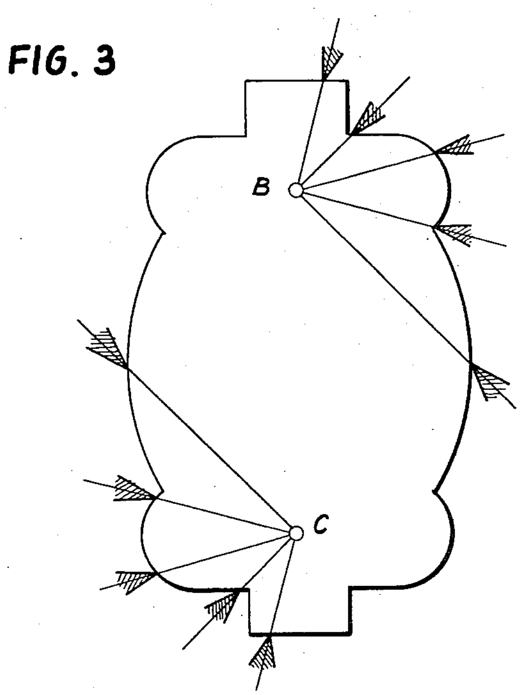
FIG. 3
Inventor:
Gérard Langel
by: Michael S. Striker
Atty

United States Patent Office 3,122,864
Patented Mar. 3, 1964

1

3,122,864
AUTOMATIC PROFILING MACHINE

Gérard Langel, Besancon, France, assignor, by mesne assignments, to A.G. Für Industrielle Elektronik Agie Losone Bei Locarno, Losone-Locarno, Switzerland Filed Feb. 6, 1962, Ser. No. 171,429
Claims priority, application France Feb. 18, 1961
10 Claims. (Cl. 51—101)

My present invention relates to improvements in automatic precision profiling machines. Such machine tools are controlled by a pattern, former or master plate which is coaxial with the work and rigidly connected thereto, said pattern and work being mounted rotatable on their common spindle. Such machines comprise a tool carrier radially movable by a tracer disposed radial with respect to the work spindle, which tracer serves for tracing or scanning the profile or pattern depths, and further a device for automatically moving the tool carrier in either direction of said spindle.

Machine tools of this type are known, for example, as profiling machines. In these, the pattern is used in full scale, and the accuracy with which the profile is transferred from the pattern on the work, corresponds at best to that of the pattern, which accuracy just about suffices for small-lot production. Where, however, accuracies in the order of one hundredth of a millimeter are required, such as in the production of gauges, electrodes for electroerosive metal working, elements of stamps and dies for precision punching tools, forming steels and disks for smallest-scale machining, said machines are no longer satisfactory.

On the other hand, precision machine tools such as grinding machines are known which use a pattern of enlarged scale. Such pattern, however, is clamped to a separate carriage and the work to another carriage. The profile is traced or engaged by a tracer which has to be pivotable and shiftable in order to reach all the pattern contour points. The tracer movements are transmitted to the tool carrier by means of complicated pantographs which reduce them to the desired scale. Such known machines require relatively much time for centering the pattern in register with the work, as pattern and work have to be reset several times, which operations entail substantial setting-up costs.

The precision machine tool disclosed by the invention is free from said disadvantages and is characterized by the fact that the pattern is used in a scale larger than full scale, i.e. the pattern is of larger size than the work.

One form of the invention is shown in the drawing, in which—FIG. 1 is a schematical perspective view of the machine; FIG. 2 is a plan view of a pattern having a single center of chucking; FIG. 3 is a plan view of another pattern having two axes of chucking; and FIG. 4 is a side-view of a modified way member for the tool-carrier sliding-block.

The machine tool shown comprises a horizontal work spindle or rotary support means 2 to which is clamped the workpiece 1 which in turn is backed by a tailstock spindle 3. Clamped coaxial to workpiece 1 is a pattern 49 on which the profile depths are larger than those to be machined on the work. The center of rotation of the pattern is chosen so that a tracer 48, 51 which is shiftable radially thereto in the horizontal plane, is capable of engaging or tracing all the profile depths extending on the pattern periphery, as is the case with the pattern shown in FIG. 2. At right angles to work spindle 2 and above same is disposed a tool spindle 4 which carries a grinding disk or other tool 13.

The grinding machine shown fundamentally comprises:

(1) A device for automatically moving the tool carrier or spindle in either longitudinal direction of the work;

2

(2) A device for controlling the tool-carrier movement radially to the work in dependency on the pattern profile depths or recesses; and (3) A feed device for automatically turning or angularly moving the work spindle, work and pattern.

The coaction and arrangement of these three devices will be described below in the order given.

The first device comprises, as operating means for spindle 4, a double toggle comprising two vertical arms 5 and two horizontal arms 6 which are pivoted on an axle 7. The free ends of the arms 6 are pivoted on tool spindle 4, and the free ends of the arms 5 are pivoted on an axle 8 which is fixed to the machine frame. On axle 8 also is pivoted a bell crank 18 of which the depending arm 18*a* at 22 is engaged by a tension spring 21 of which the other end is attached to the machine frame. On the horizontal arm 18*b* is movably mounted a fork 17 which at 16 is pivotable to swing in the vertical plane of arm 18*b* and to which is pivoted a roller 15. Below arm 18*b* is supported in bearings 24, 25 a shaft 23 parallel to the axis of rotation of work spindle 2, to which is secured a cam drum 14 on the surface of which lies roller 15 free from play under the action of spring 21. A link 19 adjustable in length by means of a threaded sleeve 20, at one end is supported on lever arm 18*b* and, at the other end, on axle 7. Shaft 23 is rotatable through a worm wheel 26 fixed thereto, by a worm shaft 27 disposed below same at right angles thereto and rotatably mounted in bearings 28 and 29. Worm shaft 27 is rotatable either by a handcrank 30 or by a motor 31.

Tool spindle 4 is mounted freely rotatable in a sliding-block 9 and is driven by a motor 65. Sliding-block 9, carrying spindle 4 and the parts 65, 13 and 6 connected thereto, is seated free from play on a guide member 10 disposed substantially horizontal in a plane parallel to the vertical axial plane of spindle 2. Member 10 at one end is pivoted at 11 to a support 64 to turn in said parallel plane, and at its other end is supported by a set-screw 12 adjustable in support 64. With the aid of set-screw 12, the base or underside of member 10 may either be made parallel to the horizontal axial plane and to the axis of work spindle 2 or set at a predetermined positive or negative angle thereto.

The curve forming the surface of drum 14 is shaped so that during a half revolution of the latter there is obtained a practically uniform stroke of tool disk 13 in one or the other longitudinal direction of work 1 via roller 15, arm 18*b*, link 19 and the two horizontal arms 6, whilst when drum 14 turns further through the second half revolution, a similar stroke takes place in the other longitudinal direction of work 1. The length of such stroke is readily adjustable by moving fork 17 on arm 18*b*. During these longitudinal movements, the tool carrier including sliding-block 9 and spindle 4 is guided on the upper guide face of guide member 10 so that the line of intersection between said upper face and the vertical median plane of member 10 determines the form of the generatrix of the profile face to be machined on workpiece 1.

Although guide member 10 shown in FIG. 1 has a plane straight bearing face for block 9, from which results a straight line as generatrix, the guide member 110 shown in FIG. 4 comprises three guide faces extending at certain angles with respect to each other, the angles being obtuse as shown in FIG. 4 from which results as generatrix a line having two angular bends. All the technically required curves are applicable to the guide member which also is adjustable with respect to its angular position relatively to the axis of spindle 2, by means of set-screw 12.

The second of said three devices comprises the tracer 51 which is shiftable in either axial direction, head 48 thereof being applicable to the periphery of pattern 49 for tracing or scanning the profile depths or recesses. Tracer 51 at its end remote from head 48 carries an axially adjustable micrometer screw 54. In an axial parallel relation to tracer 51 and below guide member 10 is disposed a slide 57 which is movable lengthwise and carries a sine bar 58 compriisng a hypotenuse face. One end of sine bar 58 is pivoted at 59 to slide 57 and the other end is fixedly supported on slide 57 by a vertical member 60 which, for example, may be of wedge shape. Sine bar 58 moves with slide 57 parallel to itself in one direction in a horizontal plane. Between tracer 51 and slide 57 is disposed a straight reversing lever 55 of which pin 56 is pivoted to the machine frame and which comprises two arms of equal length, one of said arms abutting against screw 54 of tracer 51 and the other arm abutting against an end face of slide 57. A tension spring 70 secured at one end to slide 57 and at its other end to the machine frame, ensures permanent contact of the parts 57, 55 and 51 free from play.

Support 64 of guide member 10 is guided in said vertical plane which is parallel to the vertical axial plane of work spindle 2, shiftable parallel to itself by two parallel guide rods 66, 67 in the bearings 68, 69 of the machine frame. The underside of support 64 is provided with a feeler means 63 located in said vertical plane and adjustable in length. The free lower end of feeler means 63 carries a roller 61 rotatably mounted in a fork 62. Roller 61 under the weight of the parts 4, 65, 13, 9, 10, 64, 66 and 67 rests, free from play, on the hypotenuse face of sine bar 58. During the shifting movements produced by tracer 51, therefore, support 64 and guide member 10 are moved in said vertical plane, while grinding disk 13 is moved radially with respect to the axis of rotation spindle 2 and work 1. The inclination of the hypotenuse face of sine bar 58 is adapted to the scale of enlargement of pattern 49, whereby the profile depths—scanned by tracer 48, 51 from the pattern and enlarged in accordance with the scale used for the pattern and transmitted to slide 57—are transmitted via the parts 61, 63, 64, 10 to tool carrier 9, 4 and thus to grinding disk 13 reduced by said scale in accordance with the angular position of sine bar 58. The setting of the angle of the hypotenuse face of sine bar 58 corresponding to the scale of enlargement of the pattern, is effected solely by changing the length of adjusting member 60.

The third device comprises a cam disk 32 fixed to shaft 23 of cam drum 14, which disk has two diametrical notches 34, 35. Co-acting with cam disk 32 is a lever pivoted at 52 to the machine frame and comprising three arms 37, 38 and 39 of which the first is provided with a roller 36 which is loaded by a tension spring 53 to abut against the circumference of cam disk 32, said spring being anchored to the machine frame and engaging arm 39. The notches 34, 35 are so arranged with respect to roller 36 and cam drum 14 that at the end of each half revolution of drum 14, i.e. at the dead point after a stroke of tool spindle 4, roller 36 will be engaged in one of the two notches, whereby the arms 37 to 39 under the action of spring 53 execute a pivoting movement counter-clockwise. Arm 38 through a link 40 thereby moves an arm 41 about a pivot 42 to index a ratchet wheel 44 clockwise via a pawl 43. Pivot 42 is disposed at the center of wheel 44 which in turn is fixed to the axle of a worm 45. Thus, when wheel 44 is indexed, worm 45 is turned through a fraction of a revolution. Worm 45 is continually in mesh with a worm wheel 46 fixed to work spindle 2 so that when worm 45 is turned, i.e. at the end of each tool stroke, work 1 together with spindle 2 and pattern 49 also is turned through a fraction of a revolution in correspondence with the feed-control divisions of tool spindle 4. When feed shall be effected only at the end of two strokes, i.e. after a forward and a backward movement of grinding disk 13, one of the two notches 34, 35 may be taken out of action by means of a sector 33 pivoted to disk 32 by swinging said sector in front of the respective notch. Arm 39 at its free end carries a pawl 47 pivoted thereto which is engaged to a rack 50 disposed on tracer 51, and acts during said counter-clockwise pivoting movement of the three-arm lever, i.e. during the pattern feed, to raise head 48 of the tracer from the peripheral face of pattern 49. When shaft 23 continues to rotate, the three-arm lever returns to its initial position shown, since roller 36 is disengaged again from the respective notch 34, 35. Finally a control disk 71 is rigidly secured to work spindle 2 and on its circumference carries two adjustable cams 72, 73 which actuate an electric switch 74 to automatically stop or supervise the machine drive motors at the end of the machining operation.

With the aid of the precision machine tool shown and described, the profiles most frequently met with in practice may be machined along the entire work circumference in one operation and in a single setting for rotation about axis A (FIG. 2) on both pattern and work coinciding with the axis of the rotary support means 2. More complicated profiles such as shown in FIG. 3, may be produced in two operations, two settings for rotation about the axes B and C, respectively, being required.

The precision machine tool disclosed above could be equipped, instead of grinding as shown and described, with tools for planing, milling or electro-erosive metal work and the like.

What I claim as new and desire to secure by Letters Patent, is:

1. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; means movable in one direction and operatively connected to said tracer means for movement with the same, said means including a sine bar extending at an angle to said direction and moving parallel to said direction in longitudinal direction thereof; a tool; a tool carrier for supporting the tool in the region of the workpiece and being movable in a direction transverse to said one direction for moving the tool toward and away from said axis in a plane passing through said axis; and feeler means operatively connected with said tool carrier for moving the same, said feeler means engaging said sine bar and being displaced by the same during movement of said sine bar a distance proportionally smaller than the distance of movement of said sine bar in said one direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

2. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; means movable in one direction and operatively connected to said tracer means for movement with the same, said means including a sine bar extending at an angle to said direction and moving parallel to said direction in longitudinal direction thereof; a guide means located in a plane extending parallel to said axis and being movable in said plane parallel to itself in a direction transverse to said axis; a tool; a tool carrier for supporting said tool and mounted on said guide means for movement along the same and for movement with said guide means in said transverse direction for moving said tool toward and away from said axis in a plane passing through said axis; operating means for moving said tool carrier along said guide means; and feeler means engaging said sine bar and being displaced by the same during movement of said sine bar a distance proportionally smaller than the distance of movement of said sine bar in said one direction, said feeler means being operatively connected with said guide means for moving the same with said tool carrier in said transverse direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

3. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; a slide movable in one direction and operatively connected with said tracer means for movement with the same; a sine bar mounted on said slide for pivotal movement between angular positions extending at an angle to said one direction, said sine bar being movable with said slide parallel to itself in said one direction; means for securing said sine bar in a selected angular position; a tool; a tool carrier for supporting the tool in the region of the workpiece and being movable in a direction transverse to said one direction for moving the tool toward and away from said axis in a plane passing through said axis; and feeler means operatively connected with said tool carrier for moving the same, said feeler means engaging said sine bar and being displaced by the same during movement of said sine bar a distance proportionally smaller than the distance of movement of said sine bar in said one direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

4. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; means movable in one direction and operatively connected to said tracer means for movement with the same, said means including an adjustable sine bar extending at an adjustable angle to said direction and moving parallel to said direction in longitudinal direction thereof; a guide means located in a plane extending parallel to said axis and being movable in said plane parallel to itself in a direction transverse to said axis; a tool; a tool carrier mounted on said guide means for movement along the same and for movement with said guide means in said transverse direction for supporting and moving said tool toward and away from said axis in a plane passing through said axis; operating means for moving said tool carrier along said guide means in a reciprocating motion so that the tool moves along the workpiece in an axial plane; means connecting said rotary support means with said operating means so that said rotary support means is turned stepwise when said tool carrier arrives at least at one end of the reciprocating stroke thereof; and feeler means engaging said sine bar and being displaced by the same during movement of said sine bar a distance proportionally smaller than the distance of movement of said sine bar in said one direction, said feeler means being operatively connected with said guide means for moving the same with said tool carrier in said transverse direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

5. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; means movable in one direction and operatively connected to said tracer means for movement with the same, said means including an adjustable sine bar extending at an adjustable angle to said direction and moving parallel to said direction in longitudinal direction thereof, said sine bar being located in a plane perpendicular to said axis and defining said angle in said perpendicular plane; a guide means located in a plane extending parallel to said axis and being movable in said plane parallel to itself in a direction transverse to said axis; a tool; a tool carrier for supporting said tool and mounted on said guide means for movement along the same and for movement with said guide means in said transverse direction for moving said tool toward and away from said axis in a plane passing through said axis; operating means for moving said tool carrier along said guide means in a reciprocating motion so that the tool moves along the workpiece in an axial plane; means connecting said rotary support means with said operating means so that said rotary support means is turned stepwise when said tool carrier arrives at least at one end of the reciprocating stroke thereof and feeler means engaging said sine bar and being displaced by the same during movement of said sine bar a distance proportionally smaller than the distance of movement of said sine bar in said one direction, said feeler means being operatively connected with said guide means for moving the same with said tool carrier in said transverse direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

6. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; means movable in one direction and operatively connected to said tracer means for movement with the same, said means including an adjustable sine bar extending at an adjustable angle to said direction and moving parallel to said direction in longitudinal direction thereof; a guide means located in a plane extending parallel to said axis and being movable in said plane parallel to itself in a direction tranverse to said axis, said guide means including a support and an elongated guide member mounted on said support for adjustment in said plane of said guide means between a plurality of positions including a position parallel to said axis and positions extending at an angle to said axis; a tool; a tool carrier for supporting said tool and mounted on said guide member for movement along the same and for movement with said guide member in said transverse direction for moving said tool toward and away from said axis in a plane passing through said axis; operating means for moving said tool carrier along said guide member in a reciprocating motion so that the tool moves along the workpiece in an axial plane; means connecting said rotary support means with said operating means so that said rotary support means is turned stepwise when said tool carrier arrives at least at one end of the reciprocating stroke thereof; and feeler means engaging said sine bar and being displaced by the same during movement of said sine bar a distance proportionally smaller than the distance of movement of said sine bar in said one direction, said feeler means being operatively connected with said support of said guide means for moving the same with said tool carrier in said transverse direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

7. A machine tool as set forth in claim 6 wherein said guide member is mounted at one end thereof for turning movement; and including threaded means between the other end of said guide member and said support for moving said guide member to said positions thereof.

8. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; means movable in one direction and operatively connected to said tracer means for movement with the same, said means including an adjustable sine bar extending at an adjustable angle to said direction and moving parallel to said direction in longitudinal direction thereof; a guide means located in a plane extending parallel to said axis and being movable in said plane parallel to itself in a direction transverse to said axis, said guide means including a support and an elongated guide member mounted on said support for adjustment in said plane of said guide means between a plurality of positions including a position parallel to said axis and positions extending at an angle to said axis, said guide member having a straight longitudinally extending guide face; a tool; a tool carrier mounted on said guide member for movement along said straight guide face and for movement with said guide member in said transverse direction for supporting and moving said tool toward and away from said axis in a plane passing through said axis; operating means for moving said tool carrier along said guide member in a reciprocating motion so that the tool moves along the workpiece in an axial plane; means connecting said rotary support means with said operating means so that said rotary support means is turned stepwise when said tool carrier arrives at least at one end of the reciprocating stroke thereof; and feeler means engaging said sine bar and being displaced by the same during movement of said sine bar a distance proportionally smaller than the distance of movement of said sine bar in said one direction, said feeler means being operatively connected with said support of said guide means for moving the same with said tool carrier in said transverse direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

9. In a machine tool for machining a workpiece along a profile under control of a pattern having a corresponding profile enlarged in a ratio greater than 1:1, in combination, rotary support means for supporting the pattern and the workpiece for rotation about an axis; tracer means disposed in the region of said support means so as to engage the profile of the pattern, and adapted to be moved by the pattern toward and away from said axis; means movable in one direction and operatively connected to said tracer means for movement with the same, said means including an adjustable sine bar extending at an adjustable angle to said direction and moving parallel to said direction in longitudinal direction thereof; a guide means located in a plane extending parallel to said axis and being movable in said plane parallel to itself in a direction transverse to said axis, said guide means including a support and an elongated guide member mounted on said support for adjustment in said plane of said guide means between a plurality of positions including a position parallel to said axis and positions extending at an angle to said axis, said guide member having an angular longitudinally extending guide face including a plurality of face portions defining at least one obtuse angle with each other; a tool; a tool carrier mounted on said guide member for movement along said straight guide face and for movement with said guide member in said transverse direction for supporting and moving said tool toward and away from said axis in a plane passing through said axis; operating means for moving said tool carrier along said guide member in a reciprocating motion so that the tool moves along the workpiece in an axial plane, means connecting said rotary support means with said operating means so that said rotary support means is turned stepwise when said tool carrier arrives at least at one end of the reciprocating stroke thereof; and feeler means engaging said sine bar and being displaced by the same during movement of said sine bar a distance proportionally smaller than the distance of movement of said sine bar in said one direction, said feeler means being operatively connected with said support of said guide means for moving the same with said tool carrier in said transverse direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

10. In a machine tool for machining a workpiece along a profile under control of a pattern having a corresponding profile enlarged in a ratio greater than 1:1, in combination, rotary support maens for supporting the pattern and the workpiece for rotation about an axis; tracer means disposed in the region of said support means so as to engage the profile of the pattern, and adapted to be moved by the pattern toward and away from said axis; a slide movable in one direction and operatively connected with said tracer means for movement with the same; a sine bar mounted on said slide for pivotal movement between angular positions extending at an angle to said one direction, said sine bar being movable with said slide parallel to itself in said one direction; means for securing said sine bar in a selected angular position; a guide means located in a plane extending parallel to said axis and being movable in said plane parallel to itself in a direction transverse to said axis, said guide means including a support and an elongated guide member mounted on said support for adjustment in said plane of said guide means between a plurality of positions including a position parallel to said axis and positions extending at an angle to said axis; a tool; a tool carrier mounted on said guide member for movement along the same and for movement with said guide member in said transverse direction for supporting and moving said tool toward and way from said axis in a plane passing through said axis; operating means for moving said tool carrier along said guide member; and feeler means engaging said sine bar and being displaced by the same during movement of said sine bar a distance proportionally smaller than the distance of movement of said sine bar in said one direction, said feeler means being operatively connected with said support of said guide means for moving the same with said tool carrier in said transverse direction whereby the tool is moved by said tool carrier toward and away from said axis a distance proportionally smaller than the displacement of said tracer means by the profile of the pattern so that the tool machines the workpiece along a profile reduced relative to the profile of the pattern in a ratio determined by the angular position of said sine bar.

References Cited in the file of this patent

UNITED STATES PATENTS 2,641,089 Fouquet ---------------- June 9, 1953